(12) United States Patent
Serio

(10) Patent No.: US 8,952,294 B2
(45) Date of Patent: Feb. 10, 2015

(54) WELDING TORCH HANDLE UTILIZING SLOT FOR TRIGGER ATTACHMENT

(75) Inventor: Peter Serio, Naperville, IL (US)

(73) Assignee: Illinois Tool Works Inc., Glenview, IL (US)

( * ) Notice: Subject to any disclaimer, the term of this patent is extended or adjusted under 35 U.S.C. 154(b) by 2291 days.

(21) Appl. No.: 11/804,967

(22) Filed: May 21, 2007

(65) Prior Publication Data

US 2008/0290072 A1  Nov. 27, 2008

(51) Int. Cl.
  *B23K 9/10* (2006.01)
  *B23K 9/28* (2006.01)
  *B23K 9/173* (2006.01)
  *B23K 9/29* (2006.01)
  *B23K 9/32* (2006.01)

(52) U.S. Cl.
  CPC .............. *B23K 9/282* (2013.01); *B23K 9/173* (2013.01); *B23K 9/295* (2013.01); *B23K 9/298* (2013.01); *B23K 9/323* (2013.01)
  USPC .................................................. 219/137.31

(58) Field of Classification Search
  USPC .............. 219/137.31, 137.63, 137.9
  See application file for complete search history.

(56) References Cited

U.S. PATENT DOCUMENTS

| | | | | |
|---|---|---|---|---|
| 3,469,070 A | * | 9/1969 | Bernard et al. | 219/137.31 |
| 3,629,547 A | * | 12/1971 | Kester et al. | 219/120 |
| 5,248,868 A | * | 9/1993 | Cusick, III | 219/137.62 |
| 5,698,122 A | * | 12/1997 | Lubieniecki et al. | 219/137.31 |
| 2003/0127443 A1 | * | 7/2003 | Doherty | 219/137.31 |
| 2004/0020909 A1 | * | 2/2004 | Bauer | 219/137.31 |
| 2005/0098544 A1 | * | 5/2005 | Jones et al. | 219/121.36 |
| 2005/0200087 A1 | * | 9/2005 | Vasudeva et al. | 279/143 |

FOREIGN PATENT DOCUMENTS

WO  WO 2006005121 A1 * 1/2006

* cited by examiner

*Primary Examiner* — Sang Y Paik
(74) *Attorney, Agent, or Firm* — Fletcher Yoder P.C.

(57) ABSTRACT

The present technique relates to a welding torch handle that has an unenclosed slot extending from one end thereof. This unenclosed slot provides a mechanism through which insulated signal leads of a conductor can extend from the interior of the handle to connect with a trigger disposed outside the handle. As one advantage, the unenclosed nature of the slot facilitates this coupling without the need for threading of the leads, which can damage the leads.

17 Claims, 2 Drawing Sheets

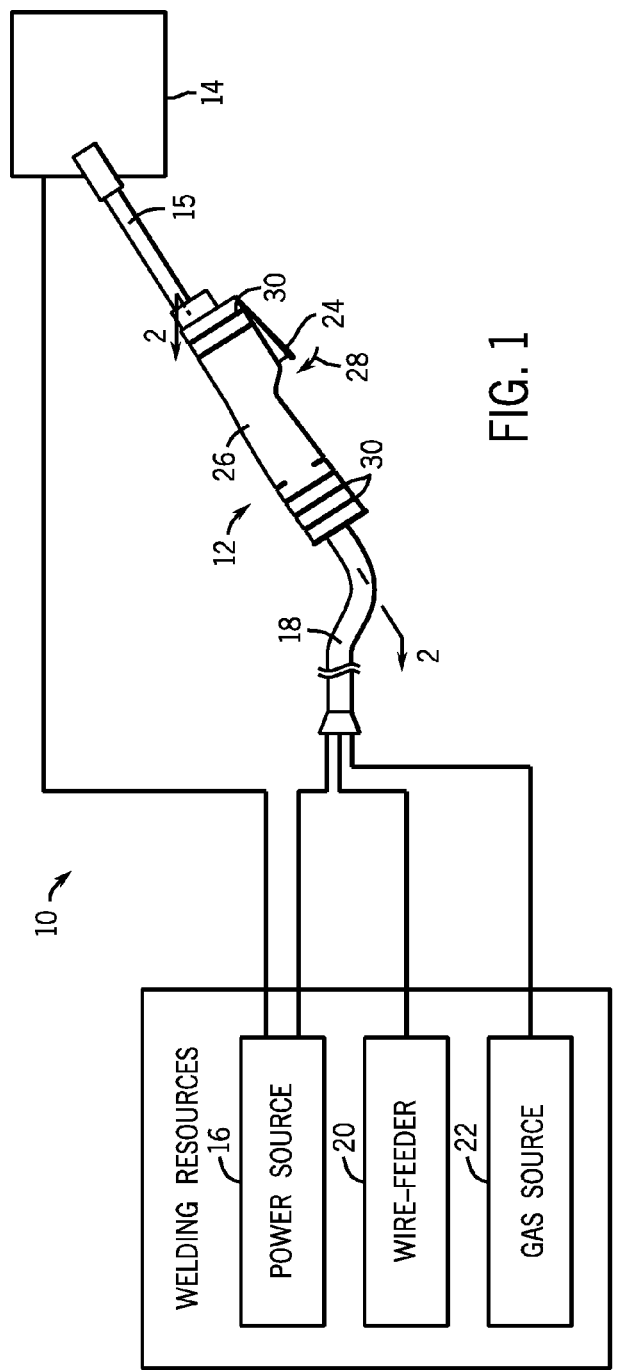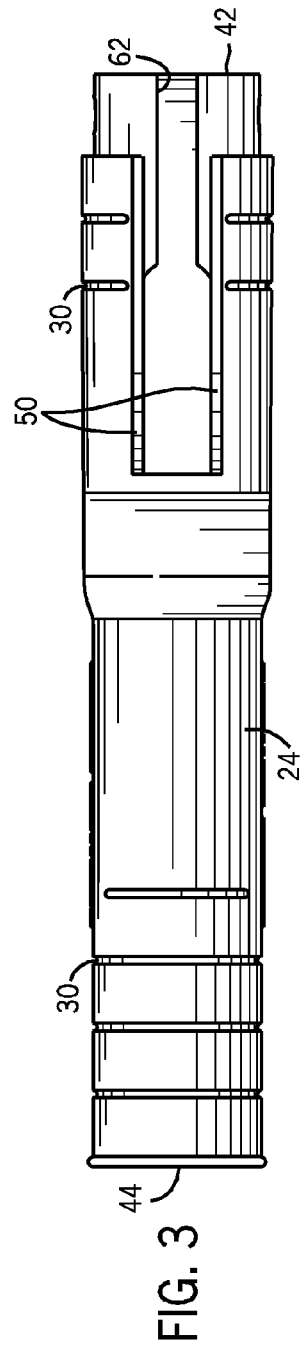

WELDING TORCH HANDLE UTILIZING SLOT FOR TRIGGER ATTACHMENT

CROSS REFERENCE TO RELATED APPLICATIONS

This application is a Non-Provisional of U.S. Provisional Application No. 60/808,102, entitled "WELDING TORCH HANDLE", filed May 24, 2006, which is herein incorporated by reference.

BACKGROUND

The present technique relates generally to welding torches and, more particular, to a welding torch handle.

A common metal welding technique employs the heat generated by electrical arcing to transition a workpiece to a molten state, to facilitate a welding process. One technique that employs this arcing principle is wire-feed welding. At its essence, wire-feed welding involves routing welding current from a power source into an electrode that is brought into close proximity with the workpiece. When close enough, current arcs from the electrode to the workpiece, completing a circuit and generating sufficient heat to weld the workpiece. Often, the electrode is consumed and becomes part of the weld itself.

Furthermore, to prevent the ingress of impurities into the molten weld, a flow a shielding material is typically provided to the weld location. By way of example, inert shielding gas is routed from a gas source, through a welding cable and welding torch, and, at its conclusion, to the weld location. Welding techniques that employ such shielding material are often referred to in the industry as gas metal arc welding (GMAW) or metal-inert gas welding (MIG).

Delivery of welding resources, such as current, shielding gas, and wire electrode, to the weld location is typically controlled by a trigger secured to a welding torch handle and electrically coupled to the welding cable that is located inside the handle. Actuating the trigger transitions a switch to the closed position, completing a circuit and providing a command signal that directs advancement of the desired welding resources into the welding cable and, ultimately, to the weld location. This command signal is transmitted through a pair of insulated conductors that is located amongst the bare welding-current-carrying conductors disposed in the welding cable. Thus, the welding assembly benefits from the electrical isolation of these command-signal-carrying insulated conductors from the remaining bare welding-current-carrying conductors sharing the same space in the welding cable.

With traditional welding torches, the welding cable is inserted into the surrounding handle, and the insulated conductors are threaded or "fished" through a closed slot in the handle, to facilitate connection of the insulated conductors with the trigger that is located outside the handle. Unfortunately, this threading or fishing process can be relatively labor intensive, particularly increasing assembly times when manufacturing large quantities of welding torches. Moreover, drawing the insulated conductors through the enclosed slot in the handle increases the likelihood of stripping of the insulation, which can lead to an electrical short between the command-signal-carrying insulated conductors and the bare welding-current-carrying conductors in the welding cable. Further still, threading the insulated conductors through the enclosed slot in the handle increases the likelihood of damage to the electrical connectors that couple the insulated conductors to the trigger, leading to decreased productivity and increases in production costs, both of which are undesirable.

Therefore, there exists a need for improved welding torch handles.

BRIEF DESCRIPTION

In accordance with certain embodiments, the present technique provides a welding torch that includes a hollow body configured to receive a welding cable therethrough. The exemplary hollow body also includes a recessed portion in which a trigger assembly can be disposed. An unenclosed slot extending through the hollow body facilitates the coupling of the insulated conductors extending from within the interior of the welding cable and the interior of the handle with terminals located on the trigger, which is located outside of the hollow body. Because of the exemplary unenclosed slot design, the insulated conductors can be coupled to the trigger without the need for fishing or threading these conductors from the interior volume of the handle within which the welding cable resides.

In accordance with another embodiment, the present technique provides a welding torch that includes a unitary handle configured to receive a welding cable. Specifically, the welding cable is received by first and second apertures respectively located at opposite ends of the handle. The handle also includes a slot that extends from the first aperture and longitudinally with respect to the handle. This exemplary slot facilitates coupling of the insulated conductors of the welding cable with the trigger without the need for threading the insulated conductors through the handle.

DRAWINGS

These and other features, aspects, and advantages of the present invention will become better understood when the following detailed description is read with reference to the accompanying drawings in which like characters represent like parts throughout the drawings, wherein:

FIG. 1 is a diagrammatic representation of a welding system, in accordance with an embodiment of the present technique;

FIG. 3 is a bottom view of a welding torch handle, in accordance with an embodiment of the present technique.

DETAILED DESCRIPTION

Figure 2:
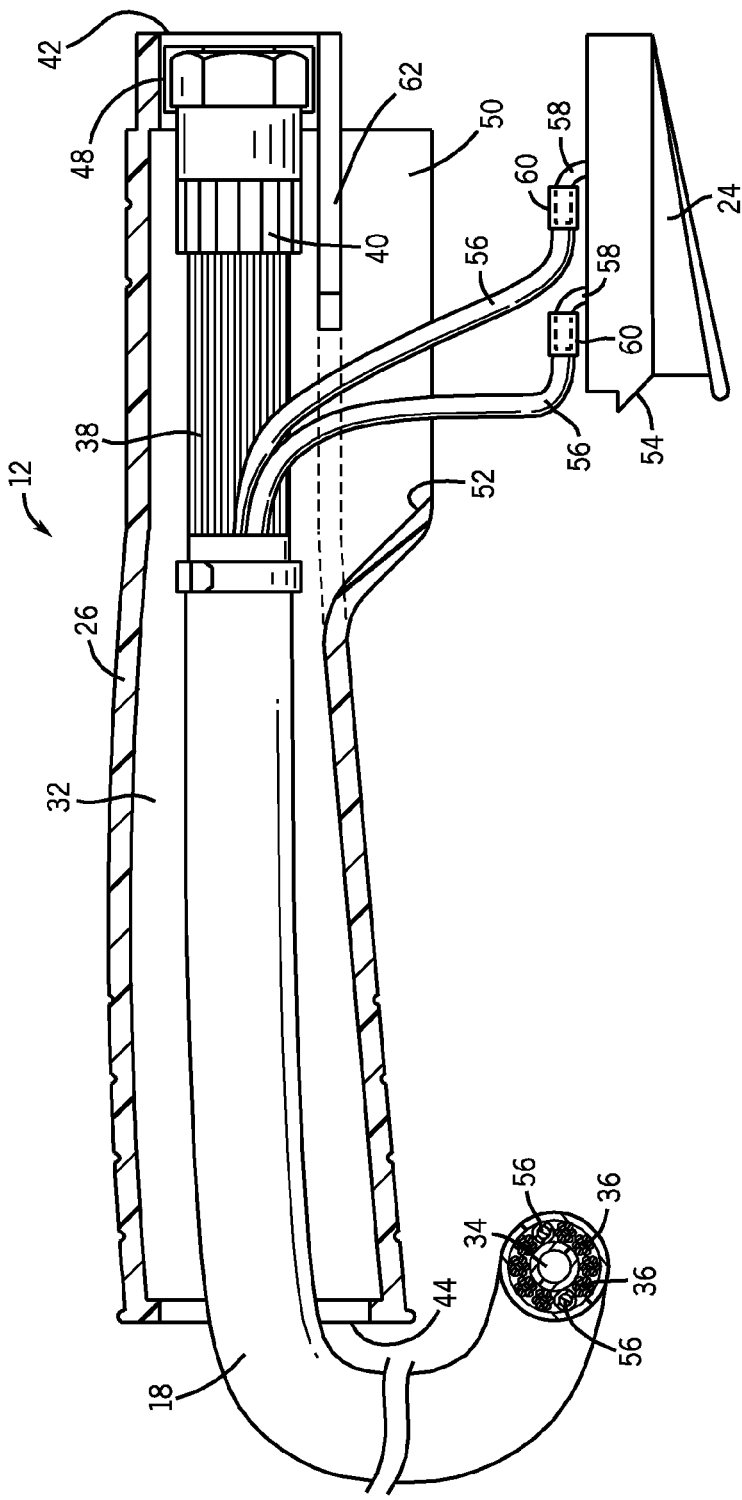
FIG. 2 is a cross-sectional representation of a welding torch along line 2-2 of FIG. 1.

As discussed in detail below, embodiments of the present technique provide a handle with an unenclosed slot that facilitates coupling of insulated conductors extending from a welding cable disposed inside a handle to a trigger located outside of the handle. Advantageously, the unenclosed nature of the slot reduces the need for threading of the insulated conductors from the interior of the handle, which can be a labor-intensive process, for instance. FIG. 1 illustrates an exemplary gas shielded, wire-feed welding system 10 that incorporates such an unenclosed slot. Prior to continuing, however, it is worth noting that the following discussion merely relates to exemplary embodiments of the present technique. As such, the appended claims should not be viewed as limited to those embodiments described herein.

Returning to the exemplary welding system 10, it includes a welding torch 12 that defines the location of the welding operation with respect to a workpiece 14. Placement of the welding torch 12 at a location proximate to the workpiece 14 allows electrical current, which is provided by a power source 16 and routed to the welding torch 12 via a welding cable 18, to arc from the welding torch 12 to the workpiece 14. In summary, this arcing completes an electrical circuit from the power source 16, to the welding torch 12 via the welding cable 18, to a wire electrode, to the workpiece 14, and, at its conclusion, back to the power source 16, generally to ground. Advantageously, this arcing generates a relatively large amount of heat causing the workpiece 14 and/or filler metal to transition to a molten state, facilitating the weld.

To produce electrical arcing, the exemplary system 10 includes a wire-feeder 20 that provides a consumable wire electrode to the welding cable 18 and, in turn, to the welding torch 12. As discussed further below, the welding torch 12 conducts electrical current to the wire electrode via a contact tip (not shown) located in the neck assembly 15, leading to arcing between the egressing wire electrode and the workpiece 14.

To shield the weld area from contaminants during welding, to enhance arc performance, and to improve the resulting weld, the exemplary system 10 includes a gas source 22 that feeds an inert, shielding gas to the welding torch 12 via the welding cable 18. It is worth noting, however, that a variety of shielding materials, including various fluids and particulate solids, may be employed to protect the weld location.

Advancement of these welding resources (e.g., welding current, wire-electrode, and shielding gas) is effectuated by actuation of a trigger 24 secured to a handle 26. By depressing the trigger 24 (arrow 28), a switch disposed within the trigger 24 is closed, causing the transmission of an electrical signal that commands promotion of the welding resources into the welding cable 18. Advantageously, the exemplary handle 26 includes a plurality of grooves 30 that improve a user's ability to grasp and wield the welding torch 12. Moreover, the exemplary handle 26 has a tapered profile that further improves the ergonomics of the handle 26. The handle's unitary, plastic construction (e.g., an injection-moldable plastic) insulates a user from electrical welding current routed through exposed portions of the welding cable, as is discussed in detail further below.

Turning to FIG. 2, this figure provides an interior view of the handle 26 introduced in FIG. 1. As illustrated, the handle 26 is a hollow body that has an interior volume 32 inside of which a portion of the welding cable 18 is located. As discussed above, the welding cable 18 guides welding resources from their respective sources to the weld location on the workpiece 14. (see FIG. 1). For example, shielding gas is routed through the welding cable 18 via a central channel 34; wire electrode is also routed through the central channel 34.

Welding current, however, is conducted through bundles of bare conductors 36 that are located in an annular space between an inner, insulated tube that defines the central channel 34 and the outer protective sheathing of the welding cable 18. Portions of the bare conductors 36 (i.e., the exposed conductor portions 38) extend beyond the protective sheathing of the welding cable 18 and are coupled to a threaded connector 40. The threaded connector 40 of the welding cable 18 is configured to mechanically engage and electrically couple with a correspondingly threaded connector of the neck assembly 15 (see FIG. 1). Thus, welding current is conducted from the electrical power source 16, into the bare conductors 36, into the threaded connectors of the welding cable 18 and neck assembly 15, respectively, and, ultimately, into the wire electrode to produce an electrical arc. Advantageously, the bare conductors 36 and the threaded connectors 40 are formed of materials with good electrical conductivity, such as copper or brass, to facilitate communication of electrical current to the egressing wire electrode.

The exemplary handle 26 is fabricated from a dielectric material, such as plastic, and has a unitary construction. As illustrated, the handle 26 includes front and rear apertures 42 and 44, respectively, that are located at opposite ends of the handle 26. In the exemplary handle 26, the rear aperture 44 has an elongate oval shape, while the front aperture 42 presents a more circular shape. The size of the front aperture 42 presents close tolerances with respect to the welding cable connector 40, for a good fit between these two elements. The exemplary handle 26 also includes an engagement boss located on an interior surface of the handle 26. Such engagement bosses interact with surfaces of the polygonal welding cable connector 40 to prevent rotation of the welding cable 18 and the handle 26 with respect to one another.

On its bottom, the exemplary handle 26 has recessed portion 48 that is configured to receive the trigger 24 (which in this embodiment is illustrated as a self-contained assembly). As illustrated, this recessed portion 48 is partially defined by a pair of flanges 50 that extend radially outward with respect to the handle 26 and that are generally parallel to one another. By providing close tolerances between the flanges 50 and the sides of the trigger 24, the flanges 50 assist in securing the trigger 24 to the handle 26. Additionally, the recessed portion 48 of the handle 26 includes a ridge 52 that is designed to engage with a lip 54 on the trigger, to partially block radial separation of the trigger 24 and handle 26 with respect to one another. When coupled to the handle 26, the trigger 24 is on the handle's 26 exterior. That is, the trigger 24 is located outside the interior volume 32 of the handle 26.

Recalling that the trigger 24 controls delivery and advancement of welding resources, the welding cable 18 includes a pair of insulated conductors 56 that are in electrical communication with the trigger 24 and that reside in the annular space between the central channel 34 and the outer sheathing of the cable 18. Thus, these insulated conductors 56 are located amongst the bare welding-current conductors 36. However, because these insulator conductors 56 route a command signal—and not welding current—the insulated conductors 56 benefit from electrical isolation from the bare conductors 36.

The insulated conductors 56 are coupled to terminals 58 of the trigger 24. Specifically, female connectors 60 on the insulated conductors 56 engage with the terminals 58 on the trigger 24. Advantageously, this engagement is a quick-connect engagement, facilitating relatively easy engagement and separation of the trigger 24 and insulated conductors 56.

To allow for extension of the insulated conductors 56 from the interior region 32 of the handle 26 to the externally located trigger 24, the handle 26 includes an unenclosed slot 62. As best illustrated in FIG. 3, the unenclosed slot 62 extends axially from the front aperture 42 of the handle 26. Thus, the openings defined by the front aperture 42 and the unenclosed slot 62 are contiguous. The exemplary unenclosed slot 62 has a U-shape, with the open end being located at the front of the handle 26. However, various shapes for the unenclosed slot 62 are envisaged.

From a manufacturing viewpoint, the unenclosed slot 62 presents various advantages. For example, when the exemplary welding torch 12 is assembled, the welding cable 18 is inserted into the front aperture 42 and advanced until the welding cable connector 40 seats with a blocking feature of the handle 26. Ultimately, the welding cable connector 40 rests at a location close to the front aperture 42. Because of the unenclosed slot 62, the insulated conductors 56, particularly the female connectors 60, may be located and remain located beyond the surfaces of the handle 26 before the welding cable 18 is fully seated. That is, as the welding cable 18 is inserted into the front aperture 42, the connectors 60 need not be brought into the interior volume 32 of the handle 26, because the insulated conductors 56 may pass through the front aperture 42 and the unenclosed slot 62, which are contiguous with one another. By contrast, if the slot in the handle were enclosed, the female connectors 60 would have to be inserted into the interior volume 32 and, subsequently threaded through the slot to engage with its trigger. By vitiating the need for threading, the unenclosed slot reduces the likelihood of damage to the female connectors 60 and insulated conductors during assembly of the handle 26. Moreover, the unenclosed slot 62 reduces assembly time, again by vitiating the need for threading the female connectors 60 from interior volume 32. And reduced assembly times can translate into reduced costs and improved productivity, both of which are desirable occurrences.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding torch, comprising:
a hollow body configured to receive a welding cable axially therethrough and having a front aperture and a slot contiguous with the front aperture, extending axially from the front aperture, and providing access to an interior region of the hollow body, wherein the welding torch further comprises a trigger having conductors that are introduced into the hollow body through the aperture and the contiguous slot.

2. The welding torch as recited in claim 1, wherein the hollow body has a unitary construction.

3. The welding torch as recited in claim 1, wherein the front aperture is defined by a pair of flanges extending radially outward with respect to the hollow body.

4. The welding torch as recited in claim 3, wherein the slot is located between the pair of flanges.

5. The welding torch as recited in claim 1, wherein the hollow body comprises a pair of apertures generally askew to a longitudinal axis of the hollow body and located at opposite ends of the hollow body, and wherein one aperture of the pair of apertures is generally oval in shape and the other aperture of the pair of apertures is generally circular.

6. The welding torch as recited in claim 1, wherein the slot is U-shaped.

7. A welding torch, comprising:
a unitary handle having an interior region configured to receive a welding cable, a first aperture, and a slot extending axially from the first aperture and contiguous with the first aperture to provide access to the interior region, wherein the welding torch further comprises a trigger having conductors that are introduced into the interior region through the first aperture and the contiguous slot.

8. The welding torch as recited in claim 7, wherein the unitary handle comprises a dielectric material.

9. The welding torch as recited in claim 7, wherein the unitary handle has a tapered profile progressing radially inward from a second aperture located at an end of the unitary handle opposite the first aperture and toward the first aperture.

10. The welding torch as recited in claim 7, wherein the slot has first and second widths, the first width being larger than the second width.

11. The welding torch as recited in claim 7, wherein the unitary handle includes a trigger-receiving portion configured to restrain movement of the trigger assembled with respect to the unitary handle.

12. The welding torch as recited in claim 7, wherein the slot is U-shaped.

13. A welding torch, comprising:
a handle having an interior region, a first aperture, and a slot contiguous with the first aperture and extending axially therethrough from the first aperture;
a welding cable having a plurality of insulated conductors and being disposed in the interior region of the handle; and
a trigger assembly coupled to the handle and having first and second terminals in electrical communication with the plurality of insulated conductors, wherein the plurality of insulated conductors extend through the slot.

14. The welding torch as recited in claim 13, wherein the trigger assembly is self-contained.

15. The welding torch as recited in claim 13, wherein the handle comprises a unitary body formed of a dielectric material.

16. The welding torch as recited in claim 13, comprising a plurality of flanges extending radially outward with respect to the handle, the flanges being configured to restrain movement of the trigger.

17. The welding torch as recited in claim 13, wherein the trigger comprises a lip configured to engage with the handle to block radial separation of the trigger with respect to the handle.

* * * * *